Aug. 31, 1926. 1,598,307
R. D. PIKE
APPARATUS FOR MELTING AND FINING GLASS
Filed Oct. 25, 1922  3 Sheets-Sheet 1
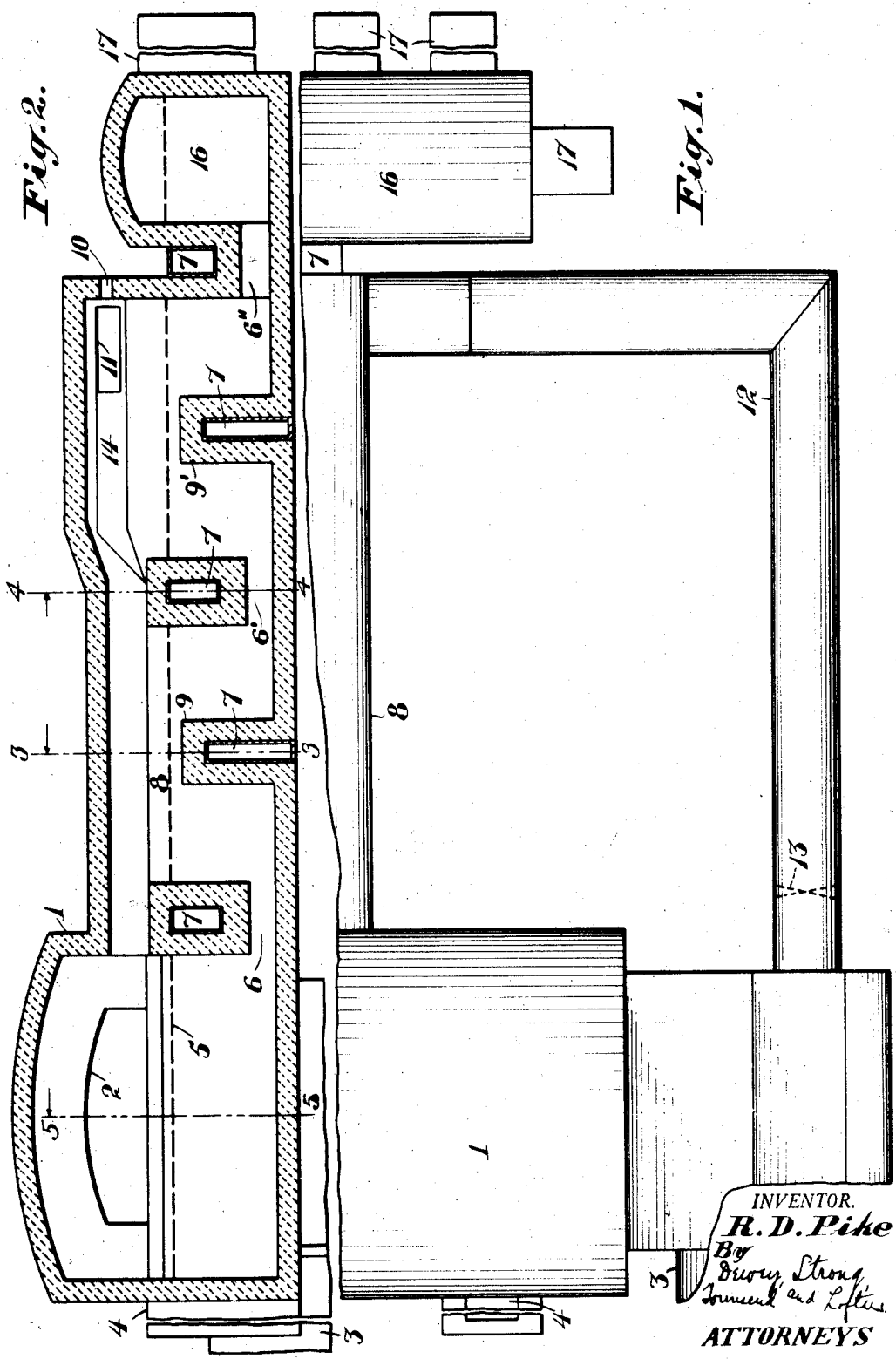
INVENTOR.
R. D. Pike
By
Drury Strong
Townsend and Loftus
ATTORNEYS Aug. 31, 1926.  
R. D. PIKE  
1,598,307  
APPARATUS FOR MELTING AND FINING GLASS  
Filed Oct. 25, 1922  3 Sheets-Sheet 2
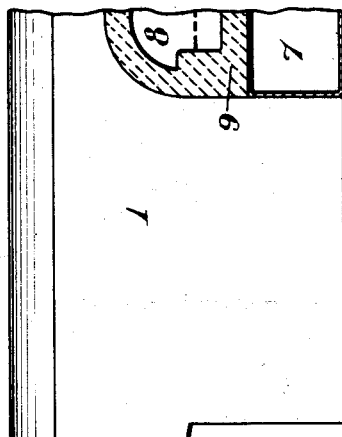
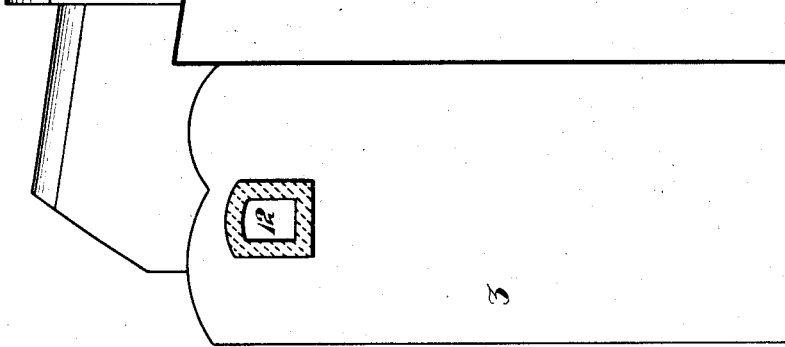
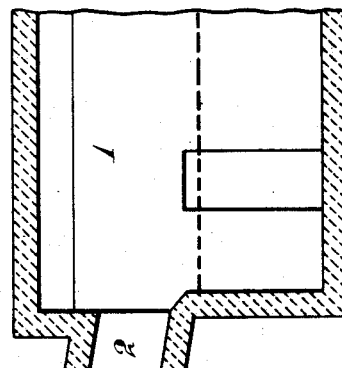
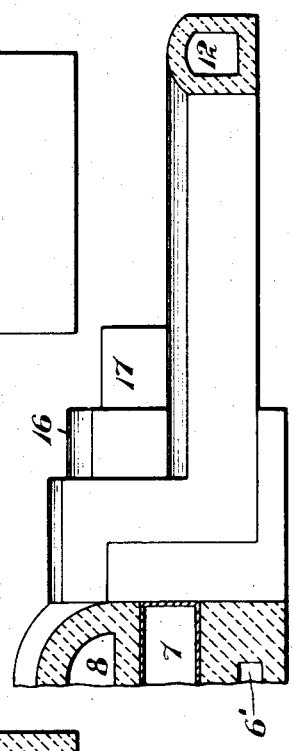
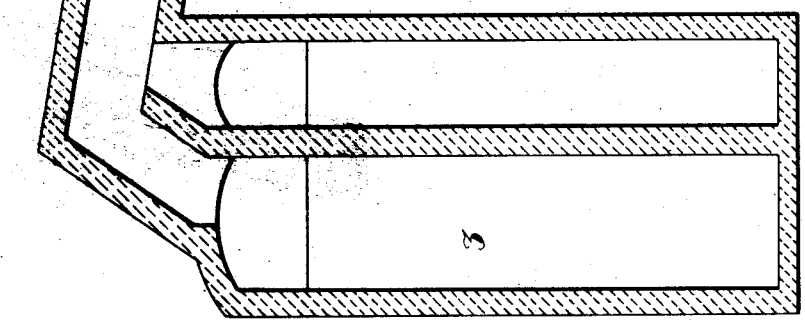

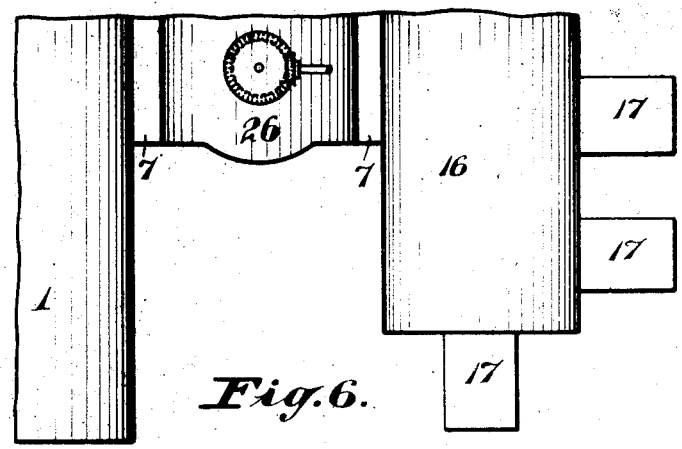
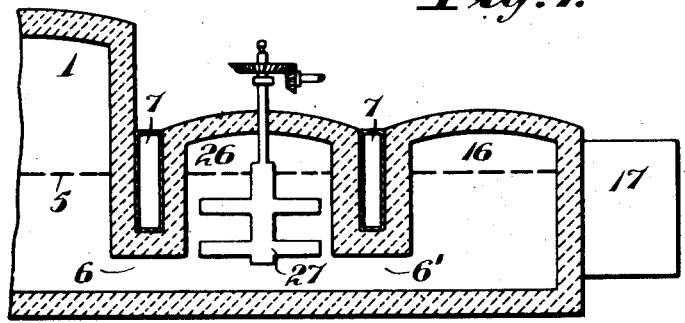

Patented Aug. 31, 1926.

1,598,307

UNITED STATES PATENT OFFICE.

ROBERT D. PIKE, OF SAN FRANCISCO, CALIFORNIA, ASSIGNOR TO COLE-FRENCH COMPANY, A CORPORATION.

APPARATUS FOR MELTING AND FINING GLASS.

Application filed October 25, 1922. Serial No. 596,731.

This invention relates to a method and apparatus for melting and fining glass.

In glass tank furnaces, as hitherto constructed, the furnaces are of the regenerative type and several flames play over the pool of molten glass alternately from either side. As a rule, the dimension of the furnace in the direction of the flame is only about one-half the dimension transverse to the flame. The raw batch is fed into the furnace at one of the shorter sides or ends, and becoming melted, proceeds gradually in a direction transverse to the flame until it leaves the melting and fining part of the furnace by passing through a submerged port in a wall which completely separates the pool of glass in this melting and fining part of the furnace from the pool of finished glass in the end of the furnace from which the glass is worked. This submerged port is small in size, usually having about 1 sq. ft. of area, and elevated only about 4″ above the floor of the furnace. And in some cases, the wall dividing the glass in the furnace proper from that in the working end is not fixed rigidly in the furnace structure, but is composed of fire-clay members which float on the glass.

In such prior furnaces the constituents of the glass, in passing through the pool in the melting and fining part of the furnace are subjected to two distinct actions; namely (a) the melting proper and (b) the fining action, which latter may be termed the process of thoroughly mixing the constituents and eliminating therefrom all of the gaseous products of decomposition of the raw batch. The action of eliminating the gas is accomplished by giving the glass sufficient time to thoroughly mix and to allow the said gaseous products to escape; but throughout the entire time used for fining, the temperature of the glass must be kept at a high point, which requires that flames must play over the entire surface of the pool of molten glass in the melting and fining portion of the furnace.

In point of time, the simple process of melting the ingredients of the batch by the heat of the flame is much shorter than the process of fining; hence, if melting only were to be considered, the process could be carried on in a much smaller furnace and with less fuel per ton of output.

I have found that if glass be melted in a furnace whose dimension with the flame is over twice as great as its dimension transverse to the flame, or of dimensions, say about 15′ x 40′, or similar in general construction to furnaces which are used for melting steel, the process of melting alone can be carried out in a much more economical and rapid manner than heretofore, although the glass issuing from a submerged port in one of the longer sides of such a furnace will not be properly fined nor ready for working. But if such glass be immediately taken and passed through some special fining device, more or less independent of the melting furnace proper, which will have a capacity for fining corresponding with the capacity for melting, and be then passed from such fining device into a compartment from whence it may be delivered as required to the working devices, a combination is arrived at for producing properly fined glass at a greater rate per sq. ft. of furnace area and for less fuel per ton of output than is possible by prior practice.

My present invention consists in a process of melting and fining glass in which melting is carried out in a furnace which is designed for efficient melting, preferably one having its dimension with the flame greater than its dimension transverse to the flame, and removing the molten glass from said melting furnace when melted, but before being completely fined and thence passing said molten glass through a device for fining, whose fining function is performed more or less independently of the melting function, and thence passing the molten glass into a compartment for working, the entire process of melting, fining and working being carried out continuously and consecutively.

In the accompanying drawings—

Fig. 1 shows a plan view of one form of apparatus for practicing my invention.

Fig. 2 shows a longitudinal, vertical, sectional view of the same.

Fig. 3 shows a sectional view taken on the line 3—3 of Fig. 1.

Fig. 4 shows a sectional view taken on the line 4—4 of Fig. 1.

Fig. 5 shows a sectional view taken on the line 5—5 of Fig. 1.

Fig. 6 shows a plan view of a modified form of furnace.

Fig. 7 shows a vertical, central, sectional view of the same.

Referring in detail to the form of my invention illustrated in Figs. 1 to 5, inclusive, 1 indicates a furnace of the open hearth, regenerative type having a port 2 for directing a flame of gas and air into the furnace and a regenerator chamber 3 of the usual design containing separate compartments with checker brick for preheating gas and air. The raw batch is fed in through the small bays 4, the level of molten glass extending throughout the entire apparatus, as indicated by the line 5. The glass in leaving the bays 4 passes through a submerged port 6, the refractories surrounding which are protected by a water jacket 7. The glass then passes through a fining compartment 8, pursuing a tortuous up and down path, first passing over a weir 9, then through a submerged port 6', then over a weir 9' and then through a submerged port 6''. All of the refractories in the ports and weirs are protected by water jackets 7.

The aforesaid travel of the glass is conducive to rapid fining, inasmuch as the lighter unfined glass is separated from the heavier finished glass, and the rise of gas bubbles to the surface is accelerated by the mixing action of the tortuous flow and by contact with the brick surfaces. However, there will be a marked cooling of the glass in passing through the fining compartment which will increase viscosity, and thereby reduce the rate of elimination of bubbles unless heat be added to the glass.

The temperature of the glass during fining is kept up by maintaining a flame in counter-current to the travel of the glass. Any suitable fuel is introduced through port 10, meeting preheated air coming through port 11. The preheated air comes through passage 12, the flow of air in which is controlled by a water-cooled reversing valve 13, which operates synchronously with the main reversing valve and keeps up a continual flow of preheated air into the combustion chamber 14 of the fining compartment from the top of the air checker chambers.

The products of combustion pass continuously through the fining chamber in counter-current to the glass and enter the main melting furnace whence they pass through the regenerators with the main gases of combustion.

The fined glass flowing from port 6'' enters the working compartment 16, whence it passes by any suitable means into the feeder boxes 17 and thence to any suitable working means.

In place of the weirs 9, 9', partition walls having submerged ports may be used, so that the glass will pass through a series of submerged ports.

A further modification of the invention consists in the use of agitation as the fining means, as illustrated in Figs. 6 and 7.

The glass, as usual, leaves the melting compartment 1 through the submerged port 6 and enters a compartment 26 which is preferably of cylindrical shape. The glass leaves the compartment 26 through submerged port 6' and enters the working compartment 16. While in compartment 26, the glass is stirred by any suitable stirring device, indicated at 27. The stirring device may be composed of hollow steel or iron members water-cooled internally, and protected externally by a refractory lining. This stirring causes the bubbles to rise to the surface in an analogous manner to the stirring of a glass of carbonated water, the sound or bubble-free glass seeking the bottom of the compartment and passing through port 6' into the working compartment.

The stirring device can be given any suitable form or desired velocity of rotation. It is well known that in prior discontinuous processes of melting glass in pots, the stirring thereof is employed as a means for assisting the fining process.

It is obvious that any suitable means may be employed for heating the glass either in compartment 27 or 16. Part or all of the means which I have described for carrying out my method may be employed in any suitable combination.

The present invention is not limited to any special means, but contemplates the continuous method of melting and fining glass which consists of melting in one compartment and thence continuously removing and transferring the melted glass to a separate fining compartment and thence continuously removing and transferring the finished glass to a separate working compartment. The production of any of the present types of furnaces, even those containing fining apparatus can be greatly increased by adding outside fining compartments, as disclosed herein.

Having thus described my invention, what I claim and desire to secure by Letters Patent is:—

1. An apparatus for melting and fining glass comprising an open-hearth regenerative furnace whose dimension longitudinally of the flame is greater than its dimension transverse thereto, a submerged port leading from said furnace, a fining compartment connected with said submerged port to continuously receive melted glass from the furnace, means in said fining compartment for mixing the constituents of the melted glass and removing therefrom the gaseous products of decomposition and a working chamber into which the glass is continuously delivered from said fining compartment.

2. An apparatus for melting and fining glass comprising an open hearth regenerative furnace, a submerged port leading from said furnace, a fining compartment connected with said submerged port to continuously receive melted glass from the furnace, means in said fining compartment for mixing the constituents of the melted glass and removing therefrom the gaseous products of decomposition, and a working chamber into which the glass is continuously delivered from the said fining compartment and means for supplying a unidirectional flame over the glass in the fining compartment, and for passing the products of combustion of said flame over the glass in the said furnace.

3. An apparatus for melting and fining glass comprising an open hearth regenerative furnace, a submerged port leading from said furnace, a fining compartment connected with said submerged port to continuously receive melted glass from the furnace, means in said fining compartment for mixing the constituents of the melted glass and removing therefrom the gaseous products of decomposition, and a working chamber into which the glass is continuously delivered from the said fining compartment, and means, independent of the said furnace, for heating the glass in the fining compartment.

4. An apparatus for melting and fining glass comprising an open hearth regenerative furnace, a submerged port leading from said furnace, a fining compartment connected with said submerged port to continuously receive melted glass from the furnace, means in said fining compartment for mixing the constituents of the melted glass and removing therefrom the gaseous products of decomposition, and a working chamber into which the glass is continuously delivered from the said fining compartment, and means for passing a continuous unidirectional stream of hot secondary air from the regenerator of said furnace over the surface of the glass in said fining compartment.

ROBERT D. PIKE.